United States Patent [19]

Sharp et al.

[11] Patent Number: 4,493,219
[45] Date of Patent: Jan. 15, 1985

[54] FORCE TRANSDUCER

[75] Inventors: Larry L. Sharp, Schaumburg; Mark Klosinski, Chicago, both of Ill.

[73] Assignee: Illinois Tool Works, Inc., Chicago, Ill.

[21] Appl. No.: 404,266

[22] Filed: Aug. 2, 1982

[51] Int. Cl.³ .......................... G01L 5/22; H01C 10/10
[52] U.S. Cl. .................................. 73/862.05; 338/47; 338/99
[58] Field of Search ........... 73/862.04, 862.05, 862.64, 73/718, 724; 338/47, 99, 114, 96; 340/365 A; 361/288, 280, 283, 278; 200/DIG. 1

[56] References Cited

U.S. PATENT DOCUMENTS

| | | | |
|---|---|---|---|
| 3,093,806 | 6/1963 | Gutterman | 73/862.62 X |
| 3,328,653 | 6/1967 | Wolf, Jr. | 73/724 X |
| 3,418,850 | 12/1968 | Goddin | 73/862.55 |
| 3,988,551 | 10/1976 | Larson | 200/5 A |
| 3,995,126 | 11/1976 | Larson | 200/5 A |
| 4,313,113 | 1/1982 | Thornburg | 340/365 A X |
| 4,315,238 | 2/1982 | Eventoff | 338/69 X |
| 4,408,103 | 10/1983 | Smith | 200/5 A X |
| 4,417,294 | 11/1983 | Herron, Jr. | 361/288 |

OTHER PUBLICATIONS

L. H. Sedaris–Elastic Diaphragm Switch, IBM Disclosure Bulletin, vol. 14, No. 3, Aug. 1971.

Primary Examiner—Charles A. Ruehl
Attorney, Agent, or Firm—Donald D. Mondul; T. W. Buckman

[57] ABSTRACT

An energy conversion and transmission device is disclosed which, in its preferred embodiment, has a rigid substrate with a resistive area printed on its top surface, a spacer of non-conductive material with an aperture therethrough positioned in register with the rigid substrate resistive area, and a flexible substrate with a resistive area printed on its bottom surface in register with the aperture and the rigid substrate resistive area so that application of a force to the flexible substrate with an elastomeric actuator will move the flexible substrate resistive area to establish an electrical contact area with the rigid substrate resistive area, which electrical contact area increases and, thus, the resistivity of that area decreases as the applied force increases. Thus, when an electrical potential is applied across the two resistive areas, current flow through the two resistive areas increases as the applied force increases. Capacitive, inductive and other embodiments of the device are also disclosed.

6 Claims, 15 Drawing Figures

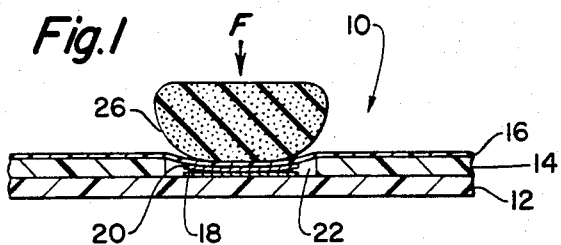
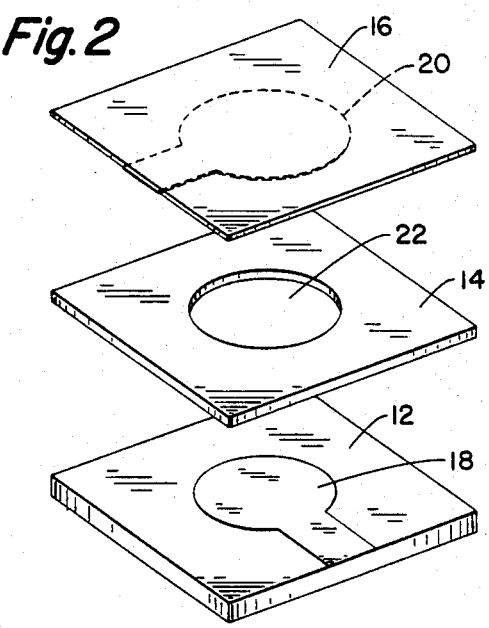
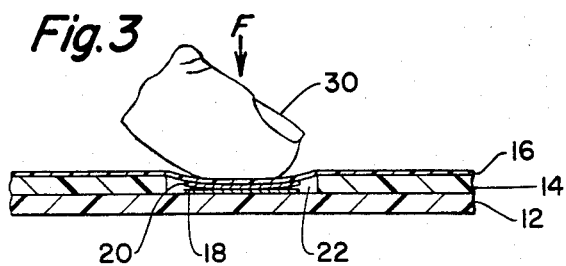
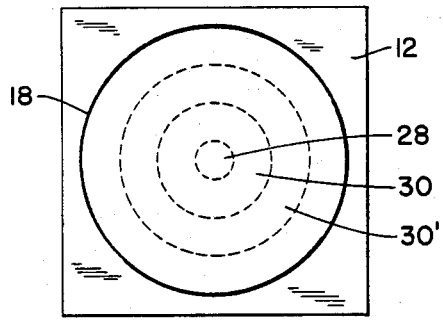
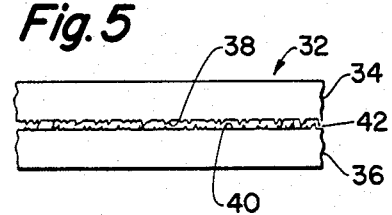
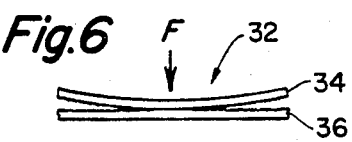
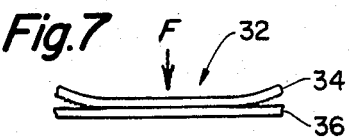
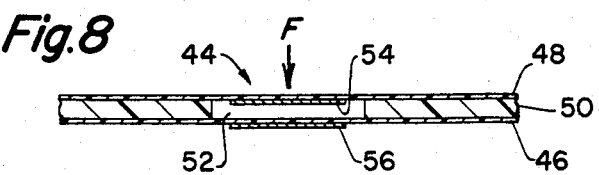

FORCE TRANSDUCER

BACKGROUND OF THE INVENTION

The present invention is directed to a device for sensing an amount of force applied to it, conversion of that force to an output of a different type of energy, and transmission of that output from the device for further processing and evaluation to indicate the amount of said force present at any given particular time. More particularly, the invention is directed to an energy conversion and transmission device employing pressure sensitive elements and producing a continuous, or analog, output in response to forces to which it is subjected.

While such energy conversion and transmission devices for production of analog outputs are not unknown in the prior art, most such devices have, at least in part, incorporated therein some mechanical linkage between the force sensing element and the output producing elements. These mechanical linkages vary in complexity, but generally involve a plurality of levers, cams, or the like to transmit the mechanical deflection imposed upon the device by the force to be detected to the output producing element of the device. Output producing elements may, for example, be potentiometers, variable inductance coils, variable capacitors having movable plates, and the like. It is a general maxim that the more moving parts contained in a device, the more there is that can go wrong with that device. Conversely, the fewer the parts contained in a device, the less prone the device is to breakdown and, hence, the more reliable the device. Thus, the most reliable device is often the device having the fewest moving parts therein.

The economics of a device are also of significant importance and such characteristics as a lower cost of construction, simplicity of construction, durability and a wide range of applications for a given technology are all important considerations in determining the economic success of a device.

SUMMARY OF THE INVENTION

The invention is a device for conversion of energy, in the form of a force applied, to an output of a different type than and proportional to the force applied. In its preferred embodiment the invention comprises a rigid substrate with a resistive area printed on its top surface, a spacer of non-conductive material with an aperture therethrough positioned in register with the resistive area printed on the top of the rigid substrate, and a flexible substrate with a resistive area printed thereon and positioned with that resistive area in register with the aperture and the resistive area on the rigid substrate in a manner whereby application of a force to the flexible substrate will move the resistive area on the flexible substrate through the aperture in the spacer and establish an electrical contact with the resistive area on the rigid substrate. Application of a given amount of force will establish an initial minimal contact area between the resistive area of the flexible substrate and the resistive area of the rigid substrate. If the force is applied with a resilient actuator, such as a finger or an elastomer actuator, an increase in the force applied to the flexible substrate will increase the contact area between the two resistive areas. This increase in contact area serves to reduce the resistivity of the electrical connection between the two resistive areas, which in turn increases the conductivity of that electrical contact in proportion to the amount of force applied to the flexible substrate, thus, the present invention converts the physical force applied to the flexible substrate proportionately to an increase in conductivity of the device; when an electrical potential is applied across the device, that is across the two resistive areas, an increase in force applied to the flexible substrate is manifested by an increase in current flow through the device via the electrical contact area between the two resistive areas. It is worthy of note that no mechanical linkages, levers, cams, potentiometers, or the like are necessary; the device is simple, reliable, durable, and inexpensive to manufacture.

The resiliency of the flexible substrate returns the flexible substrate to its original position and thereby may break electrical contact between the two resistive areas when the force is removed from the flexible substrate.

The other embodiments of the invention include variations of the above-described preferred embodiment. The apertured spacer may be removed and the device will function essentially as described above because the surfaces of the two resistive areas are not completely smooth so that if the flexible substrate and its resistive area lie adjacent the right substrate and its resistive area, with the two resistive areas in register, very little current flow will occur through the minimal contact area established between the two resistive areas simply because there is not good physical contact between them. Application of a force as described above will result in a tighter physical fit of spreading dimensions as the force is increased much as would be present with a spacer but of a more limited range than is possible with the spacer since, with a spacer present, the resiliency of the flexible substrate would return the device to a nonconductive state upon removal of the force while, in the absence of a spacer, removal of the force would merely return the device to a low conductive state as opposed to a nonconductive state. Appropriate electronic circuitry to process and evaluate the output of the device could allow for this difference while still effectively using the device without the presence of a spacer.

A further variation of the invention involves inversion of one of the substrates (either the rigid or the flexible substrate) so that movement of the flexible resistive area toward the rigid resistive area would result not in resistive coupling but in capacitive coupling proportional to the amount of force applied, since an increase in the amount of force applied would bring a greater amount of the resistive area on the flexible substrate in parallel relation with the resistive area on the rigid substrate and, consequently, increase the capacitance between the two resistive areas proportionally as the force applied to the flexible substrate is increased.

A still further embodiment of the present invention is accomplished by replacement of the resistive area on the rigid substrate with a printed spiral-like inductive pattern. With such a configuration, application of a force through a flexible actuator, such as a finger or an elastomeric actuator, would progressively short out more turns of the spiral inductive pattern on the rigid substrate through contact with the flexible resistive area, thus reducing the inductance of that pattern, as the amount of force applied to the flexible substrate is increased. Thus, the inductance of the inductive pattern printed on the top of the rigid substrate is varied proportionally to the amount of force applied to the flexible substrate.

The present invention has wide applicability in various diverse devices. For example, the resistive patterns can be expanded to a resistive pattern array with resistive areas on the flexible substrate, apertures in the spacer, and resistive areas on the rigid substrate all in register, and the actuator being a joystick-type actuator comprising a plurality of elastomer actuators mounted on a common actuator carrier and moved by a single control stick. A further enhancement of such an application would be the addition of a resistive pattern directly below the control stick with an independently operable Z-axis actuator operating against a particular area of the device configured according to the present invention to effect movement of that particular resistive area of the substrate and resultant electrical contact with the rigid resistive area as described above. Thus, analog control can be achieved employing the present invention in the X-axis, the Y-axis and the Z-axis, all with a single control stick.

Other applications of the present invention may be, for example, installation of the present application in finger-like elements of a remotely operated robotic grasping member to provide sensorial feedback to a remote operator directly to the fingers of the operator to enable the operator to directly sense the amount of grasping force applied by the robotic member and thereby effect a virtually transparent sensorial interface between the operator's hands and the robotic member.

Transducers to sense gas or liquid pressure comprise another application in which the present invention would be particularly suitable. Also, variable speed switches responsive directly to finger pressure are yet another area in which the present invention would enjoy compatibility. In the latter area, that is variable speed switches, the present invention could consist merely of a pressure sensitive pad as described in the preferred embodiment above with a removable electrical connection to provide interface with the device to be controlled which would render the removal of the speed control switch of the present invention quite simple. This easy removal would be particularly desirable in situations such as electrically controlled medical instruments which must be autoclaved prior to use on human subjects. The variable speed switch of the present invention could be removed, the device autoclaved, and the variable speed switch reconnected in a very simple straightforward manner. Moreover, hand control of the instrument would be more directly accomplished by its operator than is presently found in such medical devices since such medical devices presently are generally controlled by foot switches, knee switches, and the like.

It is therefore an object of this invention to provide an energy conversion and transmission device which is simple in construction and provides reliability and durability in its operation.

A further object of this invention is to provide an energy conversion and transmission device which is inexpensive to construct.

Yet a further object of this invention is to provide an energy conversion and transmission device capable of a wide range of commercial applications with few, if any, variations in its construction.

Still a further object of this invention is to provide an energy conversion and transmission device capable of operating resistively, capacitively, or inductively with minimal changes in structural details.

Further objects and features of the present invention will be apparent from the following specification and claims when considered in connection with the accompanying drawings illustrating the preferred embodiment of the invention.

DETAILED DESCRIPTION OF THE DRAWINGS

FIG. 1 is a side view of a schematic section drawing of the preferred embodiment of the present invention.

FIG. 2 is an exploded perspective view of a detail of the preferred embodiment showing the registering of various portions of the present invention.

FIG. 3 is a side view of a schematic drawing of the preferred embodiment of the present invention representing the interaction of the flexible substrate resistive area and the rigid substrate resistive area when a force is applied with a resilient actuator.

FIG. 4 is a top view of a schematic drawing representing the change of electrical contact area which occurs in the preferred embodiment with a change of applied force.

FIG. 5 is a side view of a schematic drawing representing two resistive areas in adjacent position, with no force applied, according to an alternate embodiment of the invention.

FIG. 6 is a side view of a schematic drawing representing the interaction of the resistive areas of FIG. 5 with a force applied to the upper area.

FIG. 7 is a side view of a schematic drawing representing the interaction of the resistive areas of FIG. 5 with a force applied to the upper area greater than the force applied in FIG. 6.

FIG. 8 is a side view of a schematic drawing representing a second alternate embodiment of the present invention showing structure of the invention as a capacitive device.

DETAILED DESCRIPTION OF THE INVENTION

Figure 9:
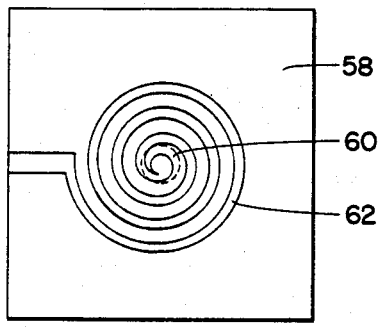
FIG. 9 is a top view of a schematic drawing representing the inductive pattern which is located on the top of the rigid substrate according to a third alternate embodiment of the invention and representing the contact area established by the resistive area of the flexible substrate in response to an applied force.

The preferred embodiment of a force conversion and transmission device 10 is shown schematically in section at FIG. 1. The force conversion and transmission device 10 is comprised of a non-conducting rigid substrate 12, a spacer 14 of non-conductive material, and a non-conducting resiliently flexible substrate 16. Affixed to the rigid substrate 12 is a resistive area 18 which is, in the preferred embodiment, comprised of an electrically propertied ink which is silk-screened on the rigid substrate 12. A similar resistive area 20 is affixed in a similar manner to the flexible substrate 16. The resistive area 18 and the resistive area 20 are in register with each other and with an aperture 22 in the spacer 14 so that electrical contact can be effected between the resistive area 18 and the resistive area 20 through the aperture 22 when a force F is applied to the flexible substrate 16 in the vicinity of the resistive area 20 urging the flexible substrate 16 carrying the resistive area 20 toward the rigid substrate 12. An actuator 26 is located in register with the aperture 22 and provides a means for application of a force F to urge the flexible substrate 16 carrying the resistive area 20 toward the rigid substrate 12 and its resistive area 18. The actuator 26 is constructed of elastomeric material in order to provide the desired interaction between the resistive areas 18 and 20 as the force F is increased, as will be discussed later.

FIG. 2 illustrates, in an exploded view, the registered relation of the flexible substrate 16 with its associated resistive area 20 affixed to the bottom side thereof, the spacer 14 with its associated aperture 22, and the rigid substrate 12 with its associated resistive area 18 affixed to the upper side thereof.

The elastomeric qualities of the actuator 26 in the preferred embodiment of FIG. 1 discussed above provides a key aspect of the operation of the force conversion and transmission device 10. FIG. 4 schematically illustrates the area of contact which occurs between resistive area 18 and resistive area 20 with increasing values of force F. In FIG. 4 the resistive area 18 which is affixed to the rigid substrate 12 is shown with a solid line as a substantially circular area. Certainly this area could be other shapes, but a circular area is shown here for sake of discussion. As the force F moves the flexible substrate 16 with the resistive area 20 affixed thereto toward the rigid substrate 12 and its resistive area 18, an initial contact area 28 is established. Increasing values of the force F operating through the elastomeric actuator 26 will produce, because of the elastomeric qualities of the actuator 26, a spreading area of contact as represented by contact areas 30 and 30′ in FIG. 4. As this contact area 28, 30 increases the resistivity of the electrical connection between resistive area 18 and resistive area 20 is reduced and, consequently, the conductivity of that electrical connection is increased. When an electrical potential (not shown) is applied across resistive areas 18 and 20, establishment of a contact area such as area 28 in FIG. 4 would permit a given amount of current to flow between the resistive areas 18 and 20. Increasing the force F and, consequently, increasing the contact area 28 to correspond to contact areas 30 or 30′, for instance, would permit a greater amount of current to flow between the resistive areas 18 and 20, which increase in current flow would be proportional to the amount of force F applied to the flexible substrate 16. Thus, the force F is converted to an electrical parameter, conductivity, and transmitted for further processing and evaluation by circuitry (not shown) in the form of variations in current flow through the resistive areas 18 and 20, which variations in current flow are proportional to variations in the force F. Thus, the present invention is a force conversion and transmission device.

FIG. 3 illustrates an alternate embodiment of the force conversion and transmission device of the present invention wherein there is a rigid substrate 12, a spacer 14, a flexible substrate 16, a resistive area 18 on the rigid substrate 12, a resistive area 20 on the flexible substrate 16, an aperture 22 in the spacer 14, and an elastomeric actuator 30 which simply comprises a human finger. The elastomeric qualities of the human finger serve very well to provide the progressive expansion of contact area between resistive areas 18 and 20 with progressively increased amount of force F in a manner similar to the effect illustrated by FIG. 4.

FIG. 5 illustrates a second alternate embodiment of the present invention showing detail of resistive pads 34 and 36 of a force conversion and transmission device 32. The detail of FIG. 5 reveals that the true nature of the surface 38 of resistive area 34 and the surface 40 of the resistive area 36 is not truly a smooth surface. These surfaces 38 and 40 actually have small peaks 42 which extend above the surfaces 38 and 40. This uneven characteristic of the surfaces 38 and 40 allows the alternate embodiment of FIG. 5 to operate in the absence of a spacer such as was provided in the preferred embodiment of FIG. 1. Application of a force through an elastomeric actuator to the device illustrated in FIG. 5 results in deflection of the resistive area 34 toward the resistive area 36 as illustrated in FIG. 6 to establish an initial contact area in substantially the same manner as was illustrated for the preferred embodiment in FIG. 4. A progressively larger value of F would establish a condition similar to that shown in FIG. 7, a condition wherein the contact area between the resistive area 34 and the resistive area 36 is enlarged in a manner substantially similar to the manner in which the contact area is increased with the preferred embodiment as illustrated in FIG. 4. The most significant difference between the alternate embodiment illustrated in FIG. 5 which has no spacer, and the preferred embodiment illustrated in FIG. 1, which has a spacer 14, is that in the preferred embodiment of FIG. 1 when there is no force F applied to the flexible substrate 16 the resiliency of that flexible substrate 16 returns the resistive area 20 to a position of little or no electrical contact with the resistive area 18, depending upon the thickness of the spacer 14, and, consequently, little or no current flow can occur between the resistive areas 18 and 20. In the alternate embodiment illustrated in FIG. 5, removal of a force F results in the flexible substrate 34 resiliently returning to a position with respect to substrate 36 where there must still be some minimal electrical contact between the surfaces 38 and 40 through the various peaks 42 on those two surfaces. Even through the alternate embodiment of FIG. 5 in its relaxed position (that is, with no force F applied) must allow some current flow between the resistive areas 34 and 36, that embodiment is a practical embodiment since external electronic circuitry (not shown) to detect and evaluate the output of the device 32 can be designed to establish threshold current values which must be exceeded before the presence of a force is acknowledged.

A third alternate embodiment of the present invention is illustrated in FIG. 8 where the invention is configured for use as a capacitive device. In FIG. 8, a force conversion and transmission device 44 is comprised of a substrate 46, a substrate 48, a spacer 50 having an aperture 52, a first capacitive area 54 affixed to the bottom of the substrate 48, and a second capacitive area 56 affixed to the bottom of the substrate 46. Application of a force F to urge the substrate 48 with its capacitive area 54 carried thereon toward the substrate 46 will result in a contact area between the capacitive area 54 and the top of substrate 46 in a manner similar to the spreading contact area discussed in connection with FIG. 4 as the force F is increased. The contact area established between the capacitive area 54 and the top of substrate 46 will be substantially parallel with the capacitive area 56 and thereby establish capacitive coupling insofar as portions of capacitive area 54 and capacitive area 56 are in parallel. Increasing force F and thereby increasing the area of capacitive area 54 which is in parallel with capacitive area 56 increases the capacitance of the device 44 and, consequently, when a potential is applied across the capacitive elements 54 and 56, appropriate external electronic circuitry (not shown) can detect such changes in capacitance, which changes in capacitance are proportional to the amount of force F applied to the substrate 48.

FIG. 9 illustrates a fourth alternate embodiment of the present invention utilizing an inductive element. FIG. 9 illustrates a top view of a substrate 58 with a generally spiral-shaped inductive element 60 affixed to the top of the substrate 58. Application of a force F (not shown) to a substrate above the substrate 58 with a resistive area affixed to the bot om thereof will produce a contact area 60 as shown in FIG. 9. The contact area 60 serves to short out a portion of the spiral-shaped inductive element 62 thereby reducing the inductance of inductive element 62.

Figure 10:
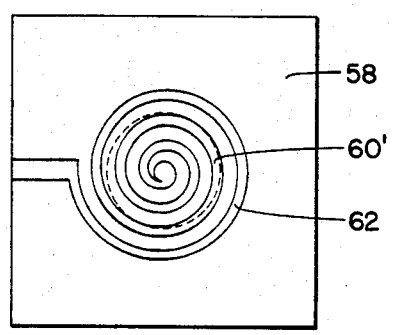
FIG. 10 is a top view of a schematic drawing representing an inductive pattern similar to that of FIG. 9 and showing increased contact area established by the resistive area of the flexible substrate in response to an applied force greater than that shown in FIG. 9.

Increasing the force F over the amount of force F depicted in FIG. 9 produces an increased contact area 60', as shown in FIG. 10. Contact area 60' serves to short out a larger portion of the inductive element 62, thereby further reducing the inductance of inductive element 62. If a potential is connected across the resistive area of the upper substrate (not shown) and the inductive element 62, the variance of inductance occasioned by the spreading contact area 60 with increased force F will vary proportionally with the force F.

Figure 11:
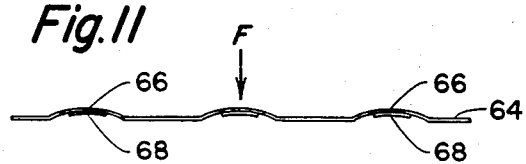
FIG. 11 is a side view of a schematic drawing representing an alternative spacer structure with resistive areas within molded protuberances.

FIG. 11 illustrates an alternative embodiment of a portion of the present invention. In FIG. 11, the spacer and the flexible substrate are incorporated into one structure in that the flexible substrate 64 has molded therein a plurality of protuberances 66, which protuberances contain electrically propertied areas 68. The electrically propertied areas 68 are so generally described since they can be resistive, capacitive, or inductive. Application of a force F against a protuberance 66 urges the protuberance 66, carrying its respective electrically propertied area 68, toward the other substrate of the device (not shown) to effect operation of the device as previously described in its various embodiments. The protuberances 66 are molded so as to be resilient and to return to their original protuberant position upon removal of the force F.

Figure 12:
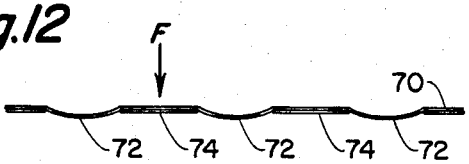
FIG. 12 is a side view of a schematic drawing representing a second alternate spacer structure with resistive areas intermediate molded protuberances.

FIG. 12 illustrates a second alternative embodiment of the flexible membrane and spacer portions of the device. In FIG. 12, the flexible substrate 70 has molded therein inverse protuberances 72. Electrically propertied areas 74 are affixed to the underside of the flexible substrate 70 intermediate the inverse protuberances 72 so that application of a force F to an area intermediate the inverse protuberances 72 will urge an electrically propertied area 74 toward the second substrate of the device (not shown) and effect operation of the device in the manner described previously in its various embodiments. The inverse protuberances 72 are molded in a manner whereby they are resilient so that they will return to their normally protuberant positions upon removal of the force F.

A further alternate embodiment of the spacer of the present invention comprises sealing the flexible substrate to the rigid substrate and maintaining a gaseous pressure between the two substrates sufficient to maintain them in spaced relation while permitting displacement of the flexible substrate toward the rigid substrate in response to a force F to effect operation of the device in the manner described previously in its various embodiments.

A still further alternate embodiment of the spacer of the present invention comprises application of tensile force to the flexible substrate to maintain the flexible substrate in spaced substantially parallel relationship with the rigid substrate and in sufficiently close proximity to the rigid substrate to permit deflection of the flexible substrate in a manner to effect operation of the device as described previously in its various embodiments.

It should be kept in mind that while the various embodiments disclosed thus far have provided for a flexible substrate and a rigid substrate, the present invention is also considered to include a structure comprising two flexible substrates.

Figure 13:
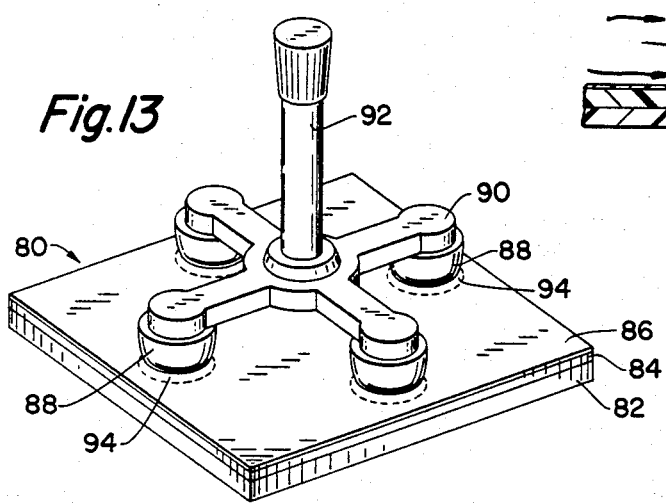
FIG. 13 is a perspective drawing of the invention showing the use of multiple resistive areas, multiple actuators on a single actuator carrier, and a single control member for movement of the actuator carrier.

FIG. 13 illustrates yet another alternate embodiment of the present invention. In FIG. 13 a force conversion and transmission device 80 has a substantially rigid bottom substrate 82, a spacer 84, and a resiliently flexible upper substrate 86. A plurality of elastomeric actuators 88 are carried on a common actuator carrier 90 which is connected to and operated by a single control stick 92. The spacer 84 has apertures therethrough (not shown) in register with resistive areas 94 affixed to the bottom of the upper substrate 86 and similar resistive areas (not shown) affixed to the top of the bottom substrate 82 and in register with the resistive areas 94. The actuators 88 are in register with the resistive areas 94. The device of FIG. 13, when connected to appropriate external electronic circuitry (not shown) provides an analog X-Y axis controller adaptable to a variety of applications such as machinery control, electronic games, and the like. In operation, the thickness of the spacer 84 may be varied to provide for the actuators 88, when in an at rest position, to effect no electrical contact between the resistive areas on the respective substrates 82 and 86, or a choice of a thinner spacer 84 will allow a minimal contact area between the resistive areas on the respective substrates 82 and 86 to be effected by the actuators 88 when in their at rest position. In such a version of the embodiment of FIG. 13, where such minimal contact areas are maintained, the associated external electronic circuitry would necessarily allow for threshold values which must be exceeded before the presence of a force exerted on a respective actuator would be acknowledged.

Figure 14:
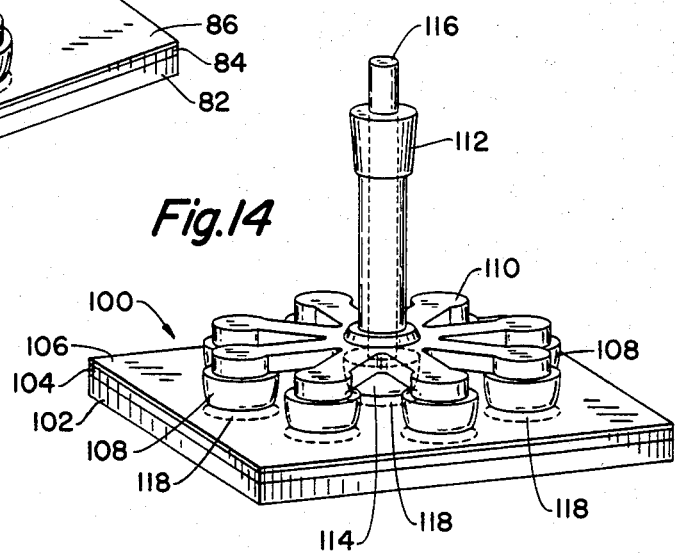
FIG. 14 is an exploded view of the invention shown in FIG. 13 with an added resistive area and an added actuator for Z-axis operation.

FIG. 14 illustrates still another alternative embodiment of the present invention which is similar to the embodiment illustrated in FIG. 13, but which has a greater plurality of actuators as well as a provision for a Z-axis control. In FIG. 14 a force conversion and transmission device 100 is shown having a rigid bottom substrate 102, a spacer 104, and a resiliently flexible upper substrate 106; a plurality of actuators 108 is carried on a common actuator carrier 110 which is connected to and controlled by a single control stick 112. Additionally there is a Z-axis actuator 114 which is attached to a control plunger 116. The control plunger 116 is concentrically captured within and freely moves within the control stick 112. Resistive areas 118, apertures (not shown) in spacer 104 and resistive areas (not shown) on substrate 102 are positioned in register with the plurality of actuators 108 and the Z-axis actuator 114 in a manner substantially similar to the manner described in FIG. 13. The device of FIG. 14, therefore, with its greater number of actuators 108 provides a finer resolution of X-Y control than does the device of FIG. 13 with a smaller plurality of actuators 88 and, additionally, the device of FIG. 14 with its control plunger 116 acting upon Z-axis actuator 114 and the associated resistive area and aperture in register therewith, provides Z-axis control with a single hand control comprised of control stick 112 and control plunger 116.

Figure 15:
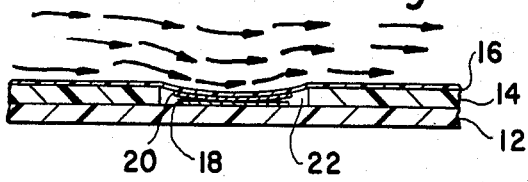
FIG. 15 is a side view of a schematic section of an alternate embodiment of the present invention used as a fluid pressure sensing device.

FIG. 15 illustrates an alternate embodiment of the present invention in a fluid pressure sensing application. The force conversion and transmission device 10 is comprised of a non-conducting rigid substrate 12, a spacer 14 of non-conductive material, and a non-conducting resiliently flexible substrate 16. Affixed to the rigid substrate 12 is a resistive area 18. A similar resistive area 20 is affixed in a similar manner to the flexible substrate 16. The resistive area 18 and the resistive area 20 are in register with each other and with an aperture 22 in the spacer 14 so that electrical contact can be effected between the resistive area 18 and the resistive area 20 through the aperture 22 when the fluid 130 exerts a pressure P to the flexible substrate 16 in the vicinity of the resistive area 20 urging the flexible substrate 16 carrying the resistive area 20 toward the rigid substrate 12. As the pressure P is increased, the rigid substrate 12 resists movement of the flexible substrate 16 causing the resistive area 20 to flatten against the resistive area 18. Thus, a pressure P increases, resistive areas 18 and 20 experience a greater area of electrical contact so that an electrical potential (not shown) connected across the resistive areas 18 and 20 will experience lesser resistance as the pressure P increases.

It is to be understood that, while the detailed drawings and specific examples given, describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An energy conversion and transmission device comprising a first non-conductive substrate, a second non-conducting substrate, an actuator means and a spacer means; said first substrate being substantially flexibly resilient and having a first plurality of electrically resistive lands affixed thereto; said second substrate being substantially rigid and having a second plurality of electrically resistive lands affixed thereto; said spacer means being intermediate said first substrate and said second substrate and maintaining said substrates in spaced, substantially parallel relation; each of said first plurality of resistive lands being in facing relation with and in register with one of said second plurality of resistive lands, said spacer means having a plurality of apertures therethrough, each of said plurality of apertures being in register with one of said first plurality of resistive lands; said actuator means comprising a plurality of elastomeric actuators, each of said plurality of actuators being in register with one of said first plurality of resistive lands; said actuator means further comprising a common actuator carrier, each of said actuators being connected to said common actuator carrier; said actuator means further comprising a common control means, said common actuator carrier being connected to and responsive to said common control means.

2. An energy conversion and transmission device as recited in claim 1 wherein said actuator means further comprises a Z-control means and a Z-actuator; said plurality of apertures, said first plurality of resistive lands, and said second plurality of resistive lands each being equal in number to and respectively in register with said plurality of actuators plus said Z-actuator; said Z-control means being connected to said Z-actuator and operable independently from said common control means.

3. An energy conversion and transmission device comprising a first electrically propertied means and a second electrically propertied means, said first means being disposed in proximate relationship with said second means and responsive to a force moving said first means with respect to said second means to vary said electrical property proportionally to said force; said second means being a substantially rigid non-conductive substrate with electrically propertied lands affixed thereto, and said first means being a substantially flexible non-conductive substrate with electrically propertied lands affixed thereto; said device further comprising spacer means disposed intermediate said first means and said second means to maintain said first means in spaced, substantially parallel relation with said second means, said spacer means being non-conductive and having a plurality of apertures therethrough, at least a portion of said electrically propertied lands of said first means, at least a portion of said electrically propertied lands of said second means, and said apertures being in register with respect to each other; said apertures allowing electrical communication therethrough between said electrically propertied lands of said first means and said electrically propertied lands of said second means; and said device further comprising means for applying said force to said first means, said means for applying said force comprising a plurality of actuators carried upon a common actuator assembly, said plurality of actuators being capable of selectively impinging upon various areas of said first means.

4. An energy conversion and transmission device as recited in claim 3 wherein said plurality of actuators equals said plurality of apertures.

5. An energy conversion and transmission device as recited in claim 4 wherein each of said plurality of actuators is in register with one of said plurality of apertures.

6. An energy conversion and transmission device as recited in claim 5 wherein more than one of said plurality of actuators is capable of impinging upon more than one area of said first means simultaneously.

* * * * *